US010785218B2

(12) United States Patent
Li

(10) Patent No.: US 10,785,218 B2
(45) Date of Patent: *Sep. 22, 2020

(54) AUTHORIZATION AUTHENTICATION METHOD, DEVICE AND SYSTEM

(71) Applicant: TENDYRON CORPORATION, Beijing (CN)

(72) Inventor: Ming Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 274 days.

This patent is subject to a terminal disclaimer.

(21) Appl. No.: 16/083,469

(22) PCT Filed: Mar. 6, 2017

(86) PCT No.: PCT/CN2017/075745
§ 371 (c)(1),
(2) Date: Sep. 7, 2018

(87) PCT Pub. No.: WO2017/152819
PCT Pub. Date: Sep. 14, 2017

(65) Prior Publication Data
US 2019/0075103 A1 Mar. 7, 2019

(30) Foreign Application Priority Data

Mar. 7, 2016 (CN) .......................... 2016 1 0127235
Mar. 7, 2016 (CN) .......................... 2016 1 0127334

(51) Int. Cl.
*G06F 7/04* (2006.01)
*H04L 29/06* (2006.01)
(Continued)

(52) U.S. Cl.
CPC .......... *H04L 63/0861* (2013.01); *G06F 21/32* (2013.01); *G06F 21/34* (2013.01);
(Continued)

(58) Field of Classification Search
CPC ........... H04L 63/0861; H04L 2209/805; H04L 63/0853; H04L 63/107; H04L 9/0825;
(Continued)

(56) References Cited

U.S. PATENT DOCUMENTS

2014/0139637 A1* 5/2014 Mistry ................... G06F 1/163
348/46
2015/0365825 A1* 12/2015 De Leon ................ G06F 21/32
726/19
(Continued)

FOREIGN PATENT DOCUMENTS

CN 103237030 A 8/2013
CN 104202744 A 12/2014
(Continued)

OTHER PUBLICATIONS

International Patent Application No. PCT/CN2017/075745; Int'l Written Opinion and the Search Report; dated May 31, 2017; 8 pages.

*Primary Examiner* — Gary S Gracia
(74) *Attorney, Agent, or Firm* — BakerHostetler

(57) ABSTRACT

The present disclosure provides an authorization authentication method, apparatus and system. The method includes: after a biological limb enters a preset range of a first device, establishing by the first device a communication connection with a second device via the biological limb; receiving by the first device information to be authorized transmitted by the second device through the communication connection, in which the information to be authorized includes digital authentication information; collecting by the first device biological characteristic information of the biological limb within a duration in which the biological limb enters the preset range of the first device; and acquiring by the first device an authentication result of authentication of the digital authentication information and the biological char-
(Continued)

acteristic information, and performing an authorization operation by the first device when the authentication result of the authentication of the digital authentication information and the biological characteristic information is passing the authentication.

12 Claims, 2 Drawing Sheets

(51) Int. Cl.
*H04L 9/32* (2006.01)
*H04B 13/00* (2006.01)
*G06F 21/34* (2013.01)
*G06F 21/32* (2013.01)
*G06F 21/46* (2013.01)
*G06K 9/00* (2006.01)
*H04L 9/08* (2006.01)
*G06F 15/16* (2006.01)

(52) U.S. Cl.
CPC ......... *G06F 21/46* (2013.01); *G06K 9/00087* (2013.01); *G06K 9/00892* (2013.01); *H04B 13/005* (2013.01); *H04L 9/0825* (2013.01); *H04L 9/3228* (2013.01); *H04L 9/3231* (2013.01); *H04L 9/3239* (2013.01); *H04L 9/3242* (2013.01); *H04L 9/3247* (2013.01); *H04L 63/0853* (2013.01); *H04L 63/107* (2013.01); *G06K 2009/00932* (2013.01); *H04L 2209/805* (2013.01)

(58) Field of Classification Search
CPC ... H04L 9/3228; H04L 9/3231; H04L 9/3239; H04L 9/3242; H04L 9/3247; G06F 21/32; G06F 21/34; G06F 21/46
See application file for complete search history.

(56) References Cited

U.S. PATENT DOCUMENTS

| | | | |
|---|---|---|---|
| 2016/0094974 A1* | 3/2016 | Muttik | H04W 4/80 370/255 |
| 2016/0171280 A1* | 6/2016 | Han | G06K 9/00926 348/77 |
| 2016/0173492 A1* | 6/2016 | Han | H04W 12/06 705/16 |
| 2016/0197917 A1* | 7/2016 | Lee | H04W 12/06 726/7 |
| 2016/0239823 A1* | 8/2016 | Bengtsson | G06Q 20/3226 |
| 2016/0342781 A1* | 11/2016 | Jeon | G06F 1/1684 |
| 2018/0008171 A1* | 1/2018 | Lee | G07C 9/00563 |
| 2018/0032784 A1* | 2/2018 | Li | G06K 9/00 |

FOREIGN PATENT DOCUMENTS

| | | | |
|---|---|---|---|
| CN | 104767760 A | | 7/2015 |
| CN | 105245341 A | | 1/2016 |
| CN | 105939336 A | | 9/2016 |
| CN | 105989495 A | | 10/2016 |
| CN | 105991652 A | | 10/2016 |
| CN | 105991653 A | | 10/2016 |
| CN | 105991654 A | | 10/2016 |
| KR | 20140119324 A | * | 10/2014 |

* cited by examiner

AUTHORIZATION AUTHENTICATION METHOD, DEVICE AND SYSTEM

CROSS REFERENCE TO RELATED APPLICATION

This application is a U.S. national phase application of International Application No. PCT/CN2017/075745, filed with the State Intellectual Property Office of P. R. China on Mar. 6, 2017, which is based upon and claims a priority to Chinese Patent Application Serial No. 201610127235.6, filed on Mar. 7, 2016 and Chinese Patent Application Serial No. 201610127334.4, filed on Mar. 7, 2016, the entire contents of which are incorporated herein by reference.

FIELD

The present disclosure relates to a field of electronic technology, and more particularly to an authorization authentication method, apparatus and system.

BACKGROUND

When a user uses an electronic device to obtain authorization of certain specific places (such as office areas and confidential areas), website register, personal items (cars, safes, etc.), dangerous items and the like, the electronic device establishes a communication connection with an electronic system provided in such places, personal items or dangerous items, and then transmits a secret key stored to the electronic system, such that the electronic system performs authentication on the secret key. Thus, with the authorization method in the related art, others may use the electronic device of the user to obtain authorization, and to execute illegal operation, which results in losses such as property and information losses of the user.

SUMMARY

The present disclosure aims to solve one of the foregoing problems.

A main objective of the present disclosure is to provide an authorization authentication method.

Another objective of the present disclosure is to provide an authorization authentication apparatus.

Still another objective of the present disclosure is to provide an authorization authentication system.

To achieve the above objectives, technical solutions of the present disclosure are implemented in detail as follows.

A first aspect of the present disclosure provides an authorization authentication method, including: after a biological limb enters a preset range of a first device, establishing by the first device a communication connection with a second device via the biological limb; receiving by the first device information to be authorized transmitted by the second device through the communication connection, in which the information to be authorized includes digital authentication information; collecting by the first device biological characteristic information of the biological limb within a duration in which the biological limb enters the preset range of the first device; and acquiring by the first device an authentication result of authentication of the digital authentication information and the biological characteristic information, and performing an authorization operation by the first device when the authentication result of the authentication of the digital authentication information and the biological characteristic information is passing the authentication.

Another aspect of the present disclosure further provides an authorization authentication apparatus, including: a connection unit, configured to establish a communication connection with an identify recognition apparatus via a biological limb after the biological limb enters a preset range of the authorization authentication apparatus; a receiving unit, configured to receive information to be authorized transmitted by the identity recognition apparatus through the communication connection, in which the information to be authorized includes digital authentication information; a collecting unit, configured to collect biological characteristic information of the biological limb within a duration in which the biological limb enters the preset range of the authorization authentication apparatus; and a performing unit, configured to acquire an authentication result of authentication of the digital authentication information and the biological characteristic information, and perform an authorization operation when the authentication result of the authentication of the digital authentication information and the biological characteristic information is passing the authentication.

Still another aspect of the present disclosure further provides an authorization authentication system, including an identify recognition apparatus and an authorization authentication apparatus described above, in which the identify recognition apparatus is configured to transmit the information to be authorized to the authorization authentication apparatus through the communication connection.

Detailed description of embodiments of the present disclosure will be made with interference to accompanying drawings in the following descriptions, and those skilled in the art will apparently know the above and other objectives, advantages and features of the present disclosure.

BRIEF DESCRIPTION OF THE DRAWINGS

Some specific embodiments of the present disclosure will be described in detail with reference to drawings in an exemplary and non-restrictive manner. Like reference numbers in the drawings refer to same or similar components or parts. Those skilled in the related art should understand that, the drawings are not necessarily drawn to scale. In the drawings.

DETAILED DESCRIPTION

In the present disclosure, communication is performed by using a biological limb, that is, two devices of the communication are integrated into a body area network by using the biological limb. The body area network (BAN) is a communication network that is centered on a human body and is composed of network elements related to the human body (including a personal terminal, and sensors and networking devices distributed on the human body, on clothes, within a certain distance range of the human body such as within 3 to 5 meters, and even inside the human body). Therefore, only when network elements related to the body enter a preset scope of a communication device, the human body communication connection of the body area network can be established.

Embodiment 1

Figure 1:
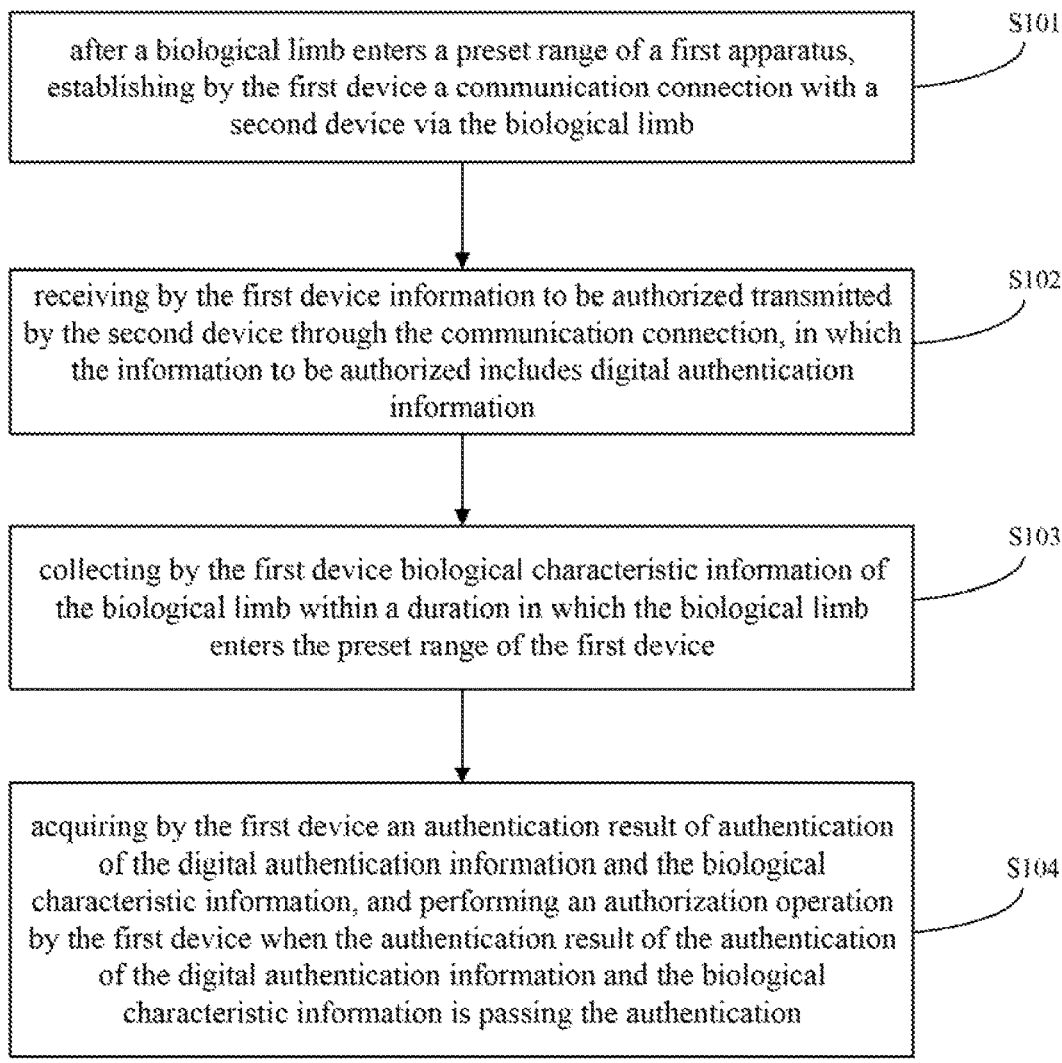
FIG. 1 is a flow chart illustrating an authorization authentication method provided in embodiment 1 of the present disclosure.

The present disclosure provides an authorization authentication method. As illustrated in FIG. 1, the method includes following blocks.

In block S101, after a biological limb enters a preset range of a first device, the first device establishes a communication connection with a second device via the biological limb.

In a detailed implementation, the first device has a biological characteristic collection function, and can communicate with the second device via the biological limb. The first device may be configured to manage entrance or using authority of places (office areas, confidential areas), website register, personal items (cars, safes, etc.), dangerous items and the like. The first device may be further configured to execute transaction, for example, it may be an access card reader, a smart car lock, a safe lock, a dangerous goods manager, a computer with biometric function, an ATM (Automatic Teller Machine), a POS (Point Of Sales) machine and the like.

The second device is provided outside the living body (including a human body, an animal body and the like), for example, is worn on the living body or carried around the living body), or is implanted into the living body. For example, the second device may be a wearable device (a smart wristwatch, smart glasses, etc.), a smart phone, a sensor device implanted into the living body and the like. When the second device is in a communication scope with the biological limb (for example, the second device is worn on the wrist or neck), the second device establishes a human body communication channel with the living body. The biological limb may be equivalent to an extended antenna of the second device. When a detecting part detects the biological limb, it is equivalent to detecting the second device.

When communicating by using the human body channel, the first device has a preset communication range. When the biological limb carrying the second device enters the preset communication ranges, the first device may detect the biological limb, and the second device may also detect the first device with the extended antenna of the biological limb. Of course, the foregoing first device and second device may further support other wired or wireless communication modes.

In a detailed implementation, the first device and the second device establish the body area network (BAN) via the biological limb, and establish the living body communication channel by using the biological limb, to implement transmitting data between the first device and the second device via the biological limb, and implement communication via the living body. The communication connection between the first device and the second device may be established via the biological limb in the wired modes or in the wireless modes, specifically, at least in one of following two modes.

Wired mode: both the first device and the second device are provided with electrodes. When the first device is in contact with the biological limb of the human body into which the second device is implanted or on which the second device is worn (for example, when a user wearing the wristwatch touches the POS machine with a finger), the body is used as the conductor, and the electrodes of both devices are connected to form a path in the human body. The path in the human body may be in a simple line mode or in a current coupling mode, thus implementing wired communication. In this case, the first device needs to be in contact with the biological limb wearing the second device, and transmits signals by a change of a power level or waveguide, thus completing the communication.

Wireless mode: in the wireless mode, both the first device and the second device may detect whether the surrounding electric field changes. When one communication party enters the range allowing the human body communication, the field strength change may be detected and the communication connection may be established.

In addition, in an aspect of initiating the communication, the communication may be initiated by the first device, which detects the second device in real time, and initiates the communication actively after detecting the second device; or, the communication may be initiated by the second device, which actively detects the first device.

In the above modes, the human body is used as a transmission medium of electrical signals to implement information interaction between devices on the body surface, in the body and around the human body (3 to 5 meters from the human body). Compared with conventional wireless communication technologies such as Bluetooth, WIFI, radio frequency and infrared, during the human body communication, the signal is transmitted through the human body, and thus the electromagnetic noise has little influence on the signal, which has advantages of low power consumption, high confidentiality and lower human damage. In addition, since there is no problem of reducing efficiency when multi-person communication occurs, a redundant connection problem of the wired communication mode may be eliminated.

In block S102, the first device receives information to be authorized transmitted by the second device through the communication connection, in which the information to be authorized includes digital authentication information.

In detailed implementation, the second device may generate information to be authorized by its own and transmit the information to be authorized to the first device, or the second device may receive the information to be authorized transmitted by an apparatus for generating the information to be authorized and transmit the information to be authorized to the first device. The information to be authorized includes information for performing the digital authentication. For example, the digital authentication information may be electronic signature information obtained by signing with a private key (when the electronic signature information is generated by the apparatus for generating the information to be authorized, the apparatus for generating the information to be authorized may be an electronic signature token, a USB key and the like); the digital authentication information may be a MAC value calculated by using a symmetric key (when the MAC value is generated by the apparatus for generating the information to be authorized, the apparatus for generating the information to be authorized may be a cipher machine and the like); the digital authentication information may be a dynamic password generated by a seed key (when the dynamic password is generated by the apparatus for generating the information to be authorized, the apparatus for generating the information to be authorized may be an OTP token and the like).

The information to be authorized may further include information representing the second device (such as product serial numbers), identity information of the holder, user accounts, and the like.

Of course, the second device may transmit the information to be authorized by broadcasting, and may further transmit information to be authorized to the second device after receiving authentication requesting information of the first device.

In block S103, the first device collects biological characteristic information of the biological limb within a duration in which the biological limb enters the preset range of the first device.

In detailed implementation, the biological characteristic information includes fingerprint information, iris information, face information, vein information and other information. The first device is provided with a module for collecting the biological characteristic information. For example, the module for collecting the biological characteristics information is a fingerprint collection module, which is configured to collect fingerprint of a finger when the finger of the human body enters a preset communication range of the first device and is in contact with the fingerprint collection module of the first device. As another example, the module for collecting the biological characteristics information is a vein collection module, which is configured to collect the vein information of the wrist when the wrist of the body enters the preset communication range of the first device and is in contact with the vein collection module. As yet another example, the module for collecting the biological characteristics information is an iris collection module, which is configured to collect the iris information of human's eyes when the human's eyes enter the preset communication range of the first device and is located in an iris collection region. As still another example, the module for collecting the biological characteristics information is a face recognition module, which is configured to collect the face information of the face when the face enters the preset communication range of the first device and is located in a face collection region.

In an implementation of the present disclosure, when the biological characteristic information is the fingerprint information and/or the vein information, collecting the biological characteristic information of the biological limb by the first device includes: in a case that the biological limb is in contact with the first device, collecting by the first device the biological characteristic information of a contact part of the biological limb in contact with the first device.

In detail, when the biological characteristic information is the fingerprint information or the vein information, the first device can collect the corresponding biological characteristic information only when the first device is in contact with the biological limb of the user. By actively contacting with the first device by the user to collect the fingerprint information or the vein information, mis-communication caused by other users inadvertently passing the first device is avoided in crowded situations, which ensures uniqueness and security of the communication, and expresses true intention and true identity of the user.

Collecting by the first device the biological characteristic information of the biological limb may be completed within a duration in which the first device establishes the communication connection with the second device, or may be completed before the first device establishes the communication connection with the second device, as long as collecting the biological characteristic information of the biological limb and authorizing the communication are completed in one continuous operation, such that consistency of the information to be authorized sent by the first device and the biological characteristic information is guaranteed.

It should be noted that, execution order of the block 103, the block 101 and the block 102 may be changed. The block 103 may be executed after the block 101 and before the block 102, or may be executed simultaneously with the block 102, or may be executed after the block 102.

In block S104, the first device acquires an authentication result of authentication of the digital authentication information and the biological characteristic information, and the first device performs an authorization operation when the authentication result of the authentication of the digital authentication information and the biological characteristic information is passing the authentication.

In detail, the first device may perform the authentication on the digital authentication information and the biological characteristic information by using pre-stored information of its own, or may transmit the digital authentication information and the biological characteristic information to a background connected with the first device, such that the background is used to perform the authentication on the digital authentication information and the biological characteristic information. When acquiring the result of passing the authentication, the first device executes corresponding authorization operations, for example, authorizing to register website, authorizing to open the door guard, and authorizing to open certain devices (cars, guns, etc.).

In detailed implementation of the present disclosure, acquiring by the first device the authentication result of the authentication of the digital authentication information and the biological characteristic information may be implemented by, but not limited to, following modes.

Mode one, the first device performs the authentication on the digital authentication information and the biological characteristic information, to obtain the authentication result. In detail, the first device may store private keys and other information related to the digital authentication and the biological characteristic, and have functional modules for performing the authentication on the digital authentication information and the biological characteristic information, and may independently complete the whole authentication procedure, such that efficiency of the authorization is improved. Moreover, since the first device may independently complete authorization, security of the authorization is ensured. For example, when the first device is an access card reader or a safe lock or the like, the authentication function is independently completed by the access card reader, the safe lock and the like, such that the user holding valid authorization information may open these devices quickly, safely and conveniently.

Mode two, the first device transmits the biological characteristic information and the digital authentication information to the background and the first device receives the authentication result transmitted by the background, in which, the authentication result is obtained by the background performing the authentication on the digital authentication information and the biological characteristic information. In detail, the first device may only complete collection on the biological characteristic information and communication with the second device. The authentication procedure is completed by the background, and the background with faster computing speed may complete complex computing quickly. In addition, the collection part and the authentication part are placed separately, which may ensure security of the system.

With the authorization authentication method, the digital authentication information of the electronic device such as the wristwatch and the biological characteristic information of the human body may be verified, which ensures correlation and uniformity of the verified digital authentication information and biological characteristic information. In the authorization authentication method of the present disclosure, the verification on the digital authentication information and the verification on the biological characteristic information of the human body are completed in a continuous operation, and once separated into two operations, the verification will not be successful, which may prevent others from using electronic device such as the wristwatch to impersonate the user and pass the authentication, and ensure security of information and property. In addition, the present disclosure may efficiently prevent illegal person from using the electronic device and the biological characteristic information of others to pass the authentication, by taking a living human body as a transmission conductor. In addition, with the authorization authentication method of the present disclosure, a plurality of digital authentication key information that the user needs to use may be stored in a portable electronic device such as the wristwatch, and the electronic device automatically transmits the digital authentication information to an authentication terminal, and then the user only needs to collect the biological characteristic information to complete authorization operations, which is convenient, fast and safe.

In an implementation of the present disclosure, the information to be authorization further includes identification information, and performing the authentication on the digital authentication information and the biological characteristic information includes: performing the authentication on the digital authentication information and the biological characteristic information based on the identification information. In detail, when the first device acquires the information to be authorized transmitted by the second device, the information to be authorized further includes the identification information configured to indicate obtaining the key information for performing the authentication on the digital authentication information and the biological characteristic information. The identification information may be serial number, name, index number and the like. The key information for performing the authentication on the digital authentication information and the biological characteristic information may be obtained quickly according to the identification information, which improves speed and efficiency of the authentication.

In an implementation of the present disclosure, performing the authentication on the digital authentication information and the biological characteristic information based on the identification information includes: obtaining authentication factor and biological characteristic verification information corresponding to the identification information, and performing digital authentication on the digital authentication information by using the authentication factor and detecting a matching ratio between the biological characteristic verification information and the biological characteristic information, in which, when the digital authentication information passes the digital authentication using the authentication factor and the matching ratio between the biological characteristic verification information and the biological characteristic information is greater than a preset value, the authentication result is passing the authentication.

In detail, the authentication factor corresponding to the digital authentication information and biological characteristic verification information corresponding to the biological characteristic information may be retrieved or found quickly according to the identification information. For example, when the digital authentication information is the electronic signature information, the identification information may be configured to find the corresponding public key for verifying the signature. The public key may be directly stored in a digital certificate, and the identification information may identify the number of the public key or the number of the digital certificate, such that the device to perform the verification may find the corresponding public key from the database quickly. When the biological characteristic information obtained is the fingerprint information, the identification information may be the number of the fingerprint information or the number of the user holding the fingerprint information, such that the corresponding authentication factor and biological characteristic verification information may be obtained quickly and accurately according to the identification information. During performing the authentication on the digital authentication information and the biological characteristic information, the authentication on the digital authentication information may be performed first, or the authentication on the biological characteristic information may be performed first, or the two authentications be performed simultaneously. Only when the authentication results of both are passing, it is determined that the authentication result is passing the authentication.

At present, the biological characteristic information is mainly verified by setting a matching threshold. The biological characteristic information collected is compared with the biological characteristic verification information, and when the matching ratio is greater than the preset matching threshold, it is determined that the collected biological characteristic information passes the verification. However, due to limitation of the current biological recognition technology, although setting a high matching threshold may ensure authenticity of the result, the high matching threshold often causes a case in which a real user is mistakenly determined as a wrong user or fails to be identified such that the authentication is rejected, resulting in inconvenience for the user's operations. For example, in the related art, when detecting that the matching ratio between the biological characteristic verification information and the biological characteristic information received is greater than a specific threshold value (such as, 99%, 90%), it is considered that the biological characteristic verification information and the biological characteristic information received are the same biological characteristic information, and the biological authentication information passes the authentication. In other words, in embodiments, the specific threshold value is a matching ratio indicating that two biological characteristic information is same. In order to avoid the condition where an illegal user also passes the authentication, the specific threshold value in the related art is usually set high, and it is easy to bring the problem that the legal user cannot be identified and the authentication fails. In order to reduce the probability of the legal user authentication failure, the preset value adopted by the present disclosure is lower than the specific threshold value in the related art, and when detecting that the matching ratio between the biological characteristic verification information and the biological characteristic information is greater than the preset value (for example, the matching ratio is greater than the preset value but lower than the specific threshold value in the related art), a final authentication result is determined with reference to the forgoing result of performing the digital authentication on the information to be authorized by using the digital authentication factor. With double verification using the biological characteristic information and the digital authentication information of the present disclosure, due to the strong authentication function of the digital authentication, the matching threshold of the biological characteristic authentication may be set lower than the matching threshold of the biological characteristic authentication of general devices, such that the probability that the user carrying the true biological characteristic is mistakenly determined as a wrong user or fails to be identified is reduced.

In an implementation of the present disclosure, performing the digital authentication on the digital authentication information by using the authentication factor and detecting the matching ratio between the biological characteristic verification information and the biological characteristic information include: performing authentication on the digital authentication information by using the authentication factor, and when the digital authentication information passes the authentication, determining whether the matching ratio between the biological characteristic information and the biological characteristic verification information is greater than the preset value; or determining whether the matching ratio between the biological characteristic information and the biological characteristic verification information is greater than the preset value, and when determining that the matching ratio between the biological characteristic information and the biological characteristic verification information is greater than the preset value, performing the authentication on the digital authentication information by using the authentication factor. In detail, during performing the authentication on the digital authentication information and the biological characteristic information, the authentication on the digital authentication information may be performed first, and the probability that the true legal user fails to be identified is reduced by guarantee of the digital authentication with strong authentication function. When the digital authentication fails, there is no need to perform the verification on the biological characteristic information, which simplifies the process. When the authentication on the biological authentication information is performed first, the fakers can be identified by verifying the biological characteristic information, such that there is no need to perform the subsequent digital authentication process, which simplifies the process.

In a detailed implementation of the present disclosure, performing the authentication on the digital authentication information may include but not limited to at least one of following modes.

Mode one, the digital authentication information includes the electronic signature information obtained by signing with the private key, the authentication factor includes the public key performing the verification on the electronic signature information, and performing the authentication on the digital authentication information by using the authentication factor includes: performing the verification on the electronic signature information by using the public key. In detail, the digital authentication in this mode is the electronic signature authentication, and the electronic signature information may be generated by signing a preset value (for example, a random number) using the private key to obtain a signature value, in which the signature value and the preset value are taken as the electronic signature information. The electronic signature verification may ensure that the digital authentication obtains true authorization of the user and have the function of preventing the user from denying the executed operation.

Mode two, the digital authentication information includes the MAC value calculated by using the symmetric key, the authentication factor includes the symmetric key for calculating the MAC value, and performing the authentication on the digital authentication information by using the authentication factor includes: calculating a MAC check value by using the symmetric key, and verifying the MAC value and the MAC check value. In detail, in this mode, the digital authentication includes encrypting the information with the symmetric key, and decrypting the information by the Prover using the symmetric key. For example, a symmetric algorithm (such as MAC calculation) is adopted to encrypt the preset value with the symmetric key to obtain a ciphertext value (such as a MAC value), and the ciphertext value and the preset value are taken as ciphertext information. In this way, security of data transmission may be guaranteed, and security of communication is improved, and moreover the identity of the user may be verified through the symmetric key preset in both sides.

Mode three, the digital authentication information includes the dynamic password generated by using the seed key, the authentication factor includes the seed key for verifying the dynamic password, and performing the authentication on the digital authentication information by using the authentication factor includes: performing the verification on the dynamic password by using the seed key. In detail, in this mode, identity is verified using the dynamic password. The dynamic password may be generated based on time or based on a challenge value. With the dynamic password, a true identity of the user may be verified, and security of the authentication is ensured.

Figure 2:
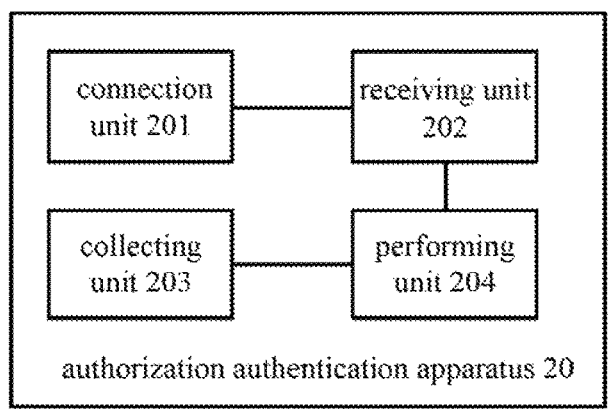
FIG. 2 is a block diagram illustrating an authorization authentication apparatus provided in embodiment 1 of the present disclosure.

Embodiments further provide an authorization authentication apparatus 20, as illustrated in FIG. 2. The authorization authentication apparatus 20 is an apparatus corresponding to the authorization authentication method. The authorization authentication apparatus 20 is equivalent to a first device in the authorization authentication method, and an identity recognition apparatus 30 is equivalent to a second device in the authorization authentication method. Here, only structure of the authorization authentication apparatus 20 will be briefly described, and other details could refer to the description of the authorization authentication method. The authorization authentication apparatus 20 includes: a connection unit 201, a receiving unit 202, a collecting unit 203, and a performing unit 204.

The connection unit 201 is configured to establish a communication connection with the identify recognition apparatus 30 via a biological limb after the biological limb enters a preset range of the authorization authentication apparatus 20.

The receiving unit 202 is configured to receive information to be authorized transmitted by the identity recognition apparatus 30 through the communication connection, in which, the information to be authorized includes digital authentication information.

The collecting unit 303 is configured to collect biological characteristic information of the biological limb within a duration in which the biological limb enters the preset range of the authorization authentication apparatus 20.

The performing unit 204 is configured to acquire an authentication result of authentication of the digital authentication information and the biological characteristic information, and perform an authorization operation when the authentication result of the authentication of the digital authentication information and the biological characteristic information is passing the authentication.

In an implementation of the present disclosure, the biological characteristic information includes fingerprint information and/or vein information.

The collecting unit 203 is configured to, in a case that the biological limb is in contact with the authorization authentication apparatus 20, collect the biological characteristic information of a contact part of the biological limb in contact with the authorization authentication apparatus 20.

In an implementation of the present disclosure, obtaining by the performing unit 204 the authentication result of authentication of the digital authentication information and the biological characteristic information may be completed by but not limited to following two modes.

Mode one, the performing unit 204 is specifically configured to perform the authentication on the digital authentication information and the biological characteristic information, to obtain the authentication result.

Mode two, the performing unit 204 is specifically configured to transmit the biological characteristic information and the digital authentication information to a background 40, and receive the authentication result transmitted by the background, in which, the authentication result is obtained by the background 40 performing the authentication on the digital authentication information and the biological characteristic information.

In an implementation of the present disclosure, the information to be authorized further includes identification information; performing the authentication on the digital authentication information and the biological characteristic information includes: performing the authentication on the digital authentication information and the biological characteristic information based on the identification information.

In an implementation of the present disclosure, performing the authentication on the digital authentication information and the biological characteristic information based on the identification information includes: obtaining authentication factor and biological characteristic verification information corresponding to the identification information, and performing digital authentication on the digital authentication information by using the authentication factor and detecting a matching ratio between the biological characteristic verification information and the biological characteristic information, in which, when the digital authentication information passes the digital authentication and the matching ratio between the biological characteristic verification information and the biological characteristic information is greater than a preset value, the authentication result is passing the authentication.

At present, the biological characteristic information is mainly verified by setting a matching threshold. The biological characteristic information collected is compared with the biological characteristic verification information, and when the matching ratio is greater than the preset matching threshold, it is determined that the collected biological characteristic information passes the verification. However, due to limitation of the current biological recognition technology, although setting a high matching threshold may ensure authenticity of the result, the high matching threshold often causes a case in which a real user is mistakenly determined as a wrong user or fails to be identified such that the authentication is rejected, resulting in inconvenience for the user's operations. For example, in the related art, when detecting that the matching ratio between the biological characteristic verification information and the biological characteristic information received is greater than a specific threshold value (such as, 99%, 90%), it is considered that the biological characteristic verification information and the biological characteristic information received are the same biological characteristic information, and the biological authentication information passes the authentication. In other words, in embodiments, the specific threshold value is a matching ratio indicating that two biological characteristic information is same. In order to avoid the condition where an illegal user also passes the authentication, the specific threshold value in the related art is usually set high, and it is easy to bring the problem that the legal user cannot be identified and the authentication fails. In order to reduce the probability of the legal user authentication failure, the preset value adopted by the present disclosure is lower than the specific threshold value in the related art, and when detecting that the matching ratio between the biological characteristic verification information and the biological characteristic information is greater than the preset value (for example, the matching ratio is greater than the preset value but lower than the specific threshold value in the related art), a final authentication result is determined with reference to the forgoing result of performing the digital authentication on the information to be authorized by using the digital authentication factor. With double verification using the biological characteristic information and the digital authentication information of the present disclosure, due to the strong authentication function of the digital authentication, the matching threshold of the biological characteristic authentication may be set lower than the matching threshold of the biological characteristic authentication of general devices, such that the probability that the user carrying the true biological characteristic is mistakenly determined as a wrong user or fails to be identified is reduced.

In an implementation of the present disclosure, performing the digital authentication on the digital authentication information by using the authentication factor and detecting the matching ratio between the biological characteristic verification information and the biological characteristic information includes:

performing the authentication on the digital authentication information by using the authentication factor, and when the digital authentication information passes the authentication, determining whether the matching ratio between the biological characteristic information and the biological characteristic verification information is greater than the preset value; or determining whether the matching ratio between the biological characteristic information and the biological characteristic verification information is greater than the preset value, and when the matching ratio between the biological characteristic information and the biological characteristic verification information is greater than the preset value, performing the authentication on the digital authentication information by using the authentication factor.

In an implementation of the present disclosure, performing the authentication on the digital authentication information may be completed by but not limited to following modes.

Mode one, the digital authentication information includes electronic signature information obtained by signing with a private key, the authentication factor includes a public key for performing verification on the electronic signature information, and performing the authentication on the digital authentication information by using the authentication factor includes: performing the verification on the electronic signature information by using the public key.

Mode two, the digital authentication information includes a MAC value calculated by using a symmetric key, the authentication factor includes the symmetric key for calculating the MAC value, and performing the authentication on the digital authentication information by using the authentication factor includes: calculating a MAC check value by using the symmetric key, and verifying the MAC value and the MAC check value.

Mode three, the digital authentication information includes a dynamic password generated by using a seed key, the authentication factor includes the seed key for verifying the dynamic password, and performing the authentication on the digital authentication information by using the authentication factor includes: performing the verification on the dynamic password by using the seed key.

Figure 3:
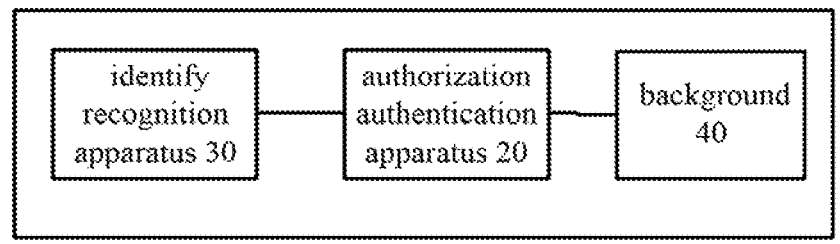
FIG. 3 is a block diagram illustrating an authorization authentication system provided in embodiment 1 of the present disclosure.

Embodiments further provide an authorization authentication system. As illustrated in FIG. 3, and the authorization authentication includes the foregoing identity recognition apparatus 30 and the foregoing authorization authentication apparatus 20.

The identity recognition apparatus 30 is configured to transmit the information to be authorized to the authorization authentication apparatus 20 through the communication connection.

In an implementation of the present disclosure, the authorization authentication system further includes a background 40. The background 40 is configured to receive the biological characteristic information and the digital authentication information transmitted by the authorization authentication apparatus 20, and perform the authentication on the digital authentication information and the biological characteristic information to obtain an authentication result, and transmit the authentication result to the authorization authentication apparatus 20.

Embodiments of the present disclosure provide a computer program, which is configured to execute the foregoing authorization authentication method when running on a processor.

The specification provided here illustrates lots of details. However, it should be understood that, embodiments of the present disclosure may be practiced without these specific details. In some embodiments, publicly known methods, structures and techniques are not illustrated in detail so as not to obscure the understanding of this specification.

Similarly, it should be understood that, in order to simplify the present disclosure and facilitate understanding of one or more of respective inventive aspects, in the foregoing description for exemplary embodiments of the present disclosure, features of the present disclosure are sometimes grouped together into a single embodiment, a single diagram, or description thereof. However, the disclosed method should not be interpreted as reflecting the following intention: the claimed present disclosure requires more features than those explicitly recited in each claim. Further, as reflected in the following claims, the inventive aspects lie in features less than all features of the single embodiment disclosed above. Therefore, the claims following the specific embodiments are hereby explicitly incorporated into the specific embodiments, in which, each of the claims is regarded as a separate embodiment of the present disclosure.

It should be understood by those skilled in the related art that, modules in the apparatuses of embodiments may be adaptively changed and placed in one or more apparatuses different from the embodiments. The modules or units or components in embodiments may be combined into one module or unit or component, and further, they may be divided into a plurality of sub-modules or sub-units or sub-components. Apart from such features and/or at least some of the processes or units being mutually exclusive, all of the features disclosed in this specification, as well as all the processes or elements of any method or device disclosed, may be combined in any combination. Unless stated otherwise, each feature disclosed in this specification may be replaced by an alternative feature that provides the same, equivalent, or similar purpose.

Various component embodiments of the present disclosure may be implemented by hardware, or by software modules running on one or more processors, or by a combination thereof.

To this end, those skilled in the art should appreciate that, although a plurality of exemplary embodiments of the present disclosure have been illustrated and described in detail herein, many other variations or modifications consistent with the principles of the present disclosure may be directly determined or derived according to content disclosed by the present disclosure, without departing from the spirit and scope of the present disclosure. Therefore, the scope of the present disclosure should be understood and construed as covering all such other variations or modifications.

What is claimed is:

1. An authorization authentication method, comprising:
after a biological limb enters a preset range of a first device, establishing by the first device a communication connection with a second device via the biological limb;
receiving by the first device information to be authorized transmitted by the second device through the communication connection, wherein the information to be authorized comprises digital authentication information;
collecting by the first device biological characteristic information of the biological limb within a duration in which the biological limb enters the preset range of the first device; and
acquiring by the first device an authentication result of authentication of the digital authentication information and the biological characteristic information, and performing an authorization operation by the first device when the authentication result of the authentication of the digital authentication information and the biological characteristic information is passing the authentication;
wherein the information to be authorized further comprises identification information, and acquiring by the first device the authentication result of the authentication of the digital authentication information and the biological characteristic information comprises:
obtaining authentication factor and biological characteristic verification information corresponding to the identification information; performing digital authentication on the digital authentication information by using the authentication factor and detecting a matching ratio between the biological characteristic verification information and the biological characteristic information; and determining that the authentication result passes the authentication when the digital authentication information passes the digital authentication and the matching ratio is greater than a preset value;
wherein performing the digital authentication on the digital authentication information by using the authentication factor comprises:
when the digital authentication information comprises a MAC value calculated by using a symmetric key, and the authentication factor comprises the symmetric key for calculating the MAC value, calculating a MAC check value by using the symmetric key and verifying the MAC value and the MAC check value; or
when the digital authentication information comprises a dynamic password generated by using a seed key, and the authentication factor comprises the seed key for verifying the dynamic password, performing the verification on the dynamic password by using the seed key.

2. The method according to claim 1, wherein,
the biological characteristic information comprises fingerprint information and/or vein information;
collecting the biological characteristic information of the biological limb by the first device comprises:
in a case that the biological limb is in contact with the first device, collecting by the first device the biological characteristic information of a contact part of the biological limb in contact with the first device.

3. The method according to claim 1, wherein, acquiring by the first device the authentication result of the authentication of the digital authentication information and the biological characteristic information comprises:
transmitting the biological characteristic information and the digital authentication information to a background by the first device;
receiving the authentication result transmitted from the background by the first device, in which, the authentication result is obtained by the background performing the authentication on the digital authentication information and the biological characteristic information.

4. The method according to claim 1, wherein, the preset value is lower than a specific threshold value, in which, the specific threshold value is a matching ratio indicating that two biological characteristic information is same.

5. The method according to claim 1, wherein performing the digital authentication on the digital authentication information by using the authentication factor and detecting the matching ratio between the biological characteristic verification information and the biological characteristic information comprises:
performing the authentication on the digital authentication information by using the authentication factor, and when the digital authentication information passes the authentication, determining whether the matching ratio between the biological characteristic information and the biological characteristic verification information is greater than the preset value; or
determining whether the matching ratio between the biological characteristic information and the biological characteristic verification information is greater than the preset value, and when the matching ratio between the biological characteristic information and the biological characteristic verification information is greater than the preset value, performing the authentication on the digital authentication information by using the authentication factor.

6. An authorization authentication apparatus, comprising:
a hardware processor; and
a memory, configured to store instructions executable by the hardware processor,
wherein, the hardware processor is configured to:
establish a communication connection with an identify recognition apparatus via a biological limb after the biological limb enters a preset range of the authorization authentication apparatus;
receive information to be authorized transmitted by the identify recognition apparatus through the communication connection, wherein the information to be authorized comprises digital authentication information;
collect biological characteristic information of the biological limb within a duration in which the biological limb enters the preset range of the authorization authentication apparatus; and
acquire an authentication result of authentication of the digital authentication information and the biological characteristic information, and perform an authorization operation when the authentication result of the authentication of the digital authentication information and the biological characteristic information is passing the authentication;
wherein the information to be authorized further comprises identification information, and the hardware processor is configured to:
obtain authentication factor and biological characteristic verification information corresponding to the identification information; perform digital authentication on the digital authentication information by using the authentication factor and detecting a matching ratio between the biological characteristic verification information and the biological characteristic information; and determining that the authentication result passes the authentication when the digital authentication information passes the digital authentication and the matching ratio is greater than a preset value;
wherein the processor is further configured to:
when the digital authentication information comprises a MAC value calculated by using a symmetric key, and the authentication factor comprises the symmetric key for calculating the MAC value, calculate a MAC check value by using the symmetric key and verify the MAC value and the MAC check value; and/or
when the digital authentication information comprises a dynamic password generated by using a seed key, and the authentication factor comprises the seed key for verifying the dynamic password, perform the verification on the dynamic password by using the seed key.

7. The apparatus according to claim 6, wherein, the biological characteristic information comprises fingerprint information and/or vein information;
the hardware processor is configured to, in a case that the biological limb is in contact with the authorization authentication apparatus, collect the biological characteristic information of a contact part of the biological limb in contact with the authorization authentication apparatus.

8. The apparatus according to claim 6, wherein,
the hardware processor is configured to transmit the biological characteristic information and the digital authentication information to a background, and receive the authentication result transmitted by the background, in which, the authentication result is obtained by the background performing the authentication on the digital authentication information and the biological characteristic information.

9. The apparatus according to claim 6, wherein, the preset value is lower than a specific threshold value, in which, the specific threshold value is a matching ratio indicating that two biological characteristic information is same.

10. The apparatus according to claim 6, wherein the processor is configured to:
perform the authentication on the digital authentication information by using the authentication factor, and when the digital authentication information passes the authentication, determine whether the matching ratio between the biological characteristic information and the biological characteristic verification information is greater than the preset value; or determine whether the matching ratio between the biological characteristic information and the biological characteristic verification information is greater than the preset value, and when the matching ratio between the biological characteristic information and the biological characteristic verification information is greater than the preset value, perform the authentication on the digital authentication information by using the authentication factor.

11. An authorization authentication system, comprising an identify recognition apparatus and an authorization authentication apparatus, wherein the authorization authentication apparatus is configured to:

establish a communication connection with the identify recognition apparatus via a biological limb after the biological limb enters a preset range of the authorization authentication apparatus;

receive information to be authorized transmitted by the identify recognition apparatus through the communication connection, wherein the information to be authorized comprises digital authentication information;

collect biological characteristic information of the biological limb within a duration in which the biological limb enters the preset range of the authorization authentication apparatus; and acquire an authentication result of authentication of the digital authentication information and the biological characteristic information, and perform an authorization operation when the authentication result of the authentication of the digital authentication information and the biological characteristic information is passing the authentication, the identify recognition apparatus is configured to transmit the information to be authorized to the authorization authentication apparatus through the communication connection;

wherein the information to be authorized further comprises identification information, and the authorization authentication apparatus is configured to:

obtain authentication factor and biological characteristic verification information corresponding to the identification information; perform digital authentication on the digital authentication information by using the authentication factor and detecting a matching ratio between the biological characteristic verification information and the biological characteristic information; and determining that the authentication result passes the authentication when the digital authentication information passes the digital authentication and the matching ratio is greater than a preset value;

wherein the authorization authentication apparatus is further configured to:

when the digital authentication information comprises electronic signature information obtained by signing with a private key, and the authentication factor comprises a public key for performing verification on the electronic signature information, perform the verification on the electronic signature information by using the public key; and/or when the digital authentication information comprises a MAC value calculated by using a symmetric key, and the authentication factor comprises the symmetric key for calculating the MAC value, calculate a MAC check value by using the symmetric key and verify the MAC value and the MAC check value; and/or when the digital authentication information comprises a dynamic password generated by using a seed key, and the authentication factor comprises the seed key for verifying the dynamic password, perform the verification on the dynamic password by using the seed key.

12. The system according to claim 11, further comprising: a background, configured to receive the biological characteristic information and the digital authentication information transmitted by the authorization authentication apparatus, perform authentication on the digital authentication information and the biological characteristic information to obtain an authentication result, and transmit the authentication result to the authorization authentication apparatus.

* * * * *